United States Patent
Carlström (10) Patent No.: US 6,635,213 B1
(45) Date of Patent: Oct. 21, 2003

(54) METHOD OF PRODUCING CENTRIFUGALLY CAST, GLASS FIBER REINFORCED PLASTIC TUBES

(75) Inventor: Börge Carlström, Hoganas (SE)

(73) Assignee: C-Tech Ltd., Manama (BH)

(*) Notice: Subject to any disclaimer, the term of this patent is extended or adjusted under 35 U.S.C. 154(b) by 0 days.

(21) Appl. No.: 09/868,935

(22) PCT Filed: Jan. 19, 2000

(86) PCT No.: PCT/EP00/00406
§ 371 (c)(1),
(2), (4) Date: Jul. 18, 2001

(87) PCT Pub. No.: WO00/43185
PCT Pub. Date: Jul. 27, 2000

(30) Foreign Application Priority Data

Jan. 22, 1999 (DE) .......................................... 199 02 456
Jun. 18, 1999 (DE) .......................................... 199 27 954
Oct. 25, 1999 (DE) .......................................... 199 51 316

(51) Int. Cl.[7] .......................... B29C 39/08; B29C 39/12; B29C 41/04; B29C 41/22
(52) U.S. Cl. ...................... 264/240; 264/255; 264/256; 264/260; 264/310; 264/311
(58) Field of Search ................................ 264/255, 310, 264/311, 301, 302, 256, 240, 260, 328.6, 308; 425/435, 439

(56) References Cited

U.S. PATENT DOCUMENTS

| | | | | | |
|---|---|---|---|---|---|
| 1,720,719 A | * | 7/1929 | Casto | .......................... | 264/311 |
| 2,826,869 A | * | 3/1958 | Lerch | .......................... | 65/71 |
| 3,117,346 A | * | 1/1964 | Bertin et al. | ................. | 425/430 |
| RE25,587 E | * | 6/1964 | Wiltshire | ..................... | 264/114 |
| 3,234,315 A | * | 2/1966 | Blue et al. | .................. | 264/310 |
| 3,561,059 A | | 2/1971 | Guldenfels | | |
| 3,754,852 A | * | 8/1973 | Rempel | ....................... | 425/429 |
| 4,043,721 A | * | 8/1977 | Lemelson | .................... | 425/116 |
| 4,705,660 A | * | 11/1987 | Demarle | ...................... | 264/108 |
| 4,980,112 A | | 12/1990 | Masters | | |
| 5,202,076 A | | 4/1993 | Carlstrom | | |
| 5,306,458 A | * | 4/1994 | Carlstrom et al. | .......... | 264/255 |
| 5,362,528 A | | 11/1994 | Carlstrom | | |

FOREIGN PATENT DOCUMENTS

| | | |
|---|---|---|
| CA | 1284009 | 5/1991 |
| DE | 1479548 | 2/1970 |
| EP | 1051851 | 12/1966 |
| JP | 01128812 | 5/1989 |
| ZA | 98/4943 | 6/1998 |

OTHER PUBLICATIONS

"Centrifugal Processes for Rotationally Symmetrical GFK [Glass Fibre–Reinforced Synthetic Material] Bodies", Bryde, AVK, Freudenstadt, Oct. 1977 pp 1–21 with English translation.

* cited by examiner

Primary Examiner—Angela Ortiz
(74) Attorney, Agent, or Firm—Dennison, Schultz & Dougherty (57) ABSTRACT

The subject of the invention is a method of manufacturing centrifuged, glass fiber-reinforced synthetic material pipes wherein liquid, curable resin, which contains a filler, together with glass fibers, additives for the curing process, possibly also with sand, is introduced into a rotating mould and the temperature of the mould is between 40° C. and 75° C. as the raw materials are introduced. The resin used in the layers in the outer region of the pipe has a gel time which is equal to or greater than the gel time of the resin used for the inner region of the pipe and the resin comprising a filler content of at least 40% is used. Furthermore, once the exothermal reaction has commenced, warm water is sprayed onto the mould in order to maintain the temperature of the mould at least at 60° C. until the pipe is removed.

28 Claims, 8 Drawing Sheets

METHOD OF PRODUCING CENTRIFUGALLY CAST, GLASS FIBER REINFORCED PLASTIC TUBES

BACKGROUND OF THE INVENTION

The invention relates to a method and apparatus for manufacturing centrifuged, glass fibre-reinforced synthetic material pipes which involve introducing liquid, curable resin, which can contain a filler, together with glass fibres and additives for the curing process, possibly also with sand, into a rotating mould. Furthermore, the invention relates to centrifuged, glass fibre-reinforced pipes which comprise several layers of cut lengths of glass fibres, polyester resin comprising a filler and sand as well as internal and external cover layers, layers which are glass fibre-reinforced internally and externally comprising polyester resin and a filler as well as in the middle comprising a core part of sand, polyester resin, filler and glass fibres, alternatively centrifuged, glass fibre-reinforced pipes comprising several layers of cut lengths of glass fibres and polyester resin comprising a filler, with glass fibres and a core part of sand.

When manufacturing centrifuged, glass fibre-reinforced synthetic material pipes, in particular when filled polyester resins are used, the long term annular rigidity is extremely low. An aim of this invention is to improve the long term annular rigidity.

In the case of known methods of manufacturing sand-filled, centrifuged glass fibre-reinforced synthetic material pipes, the manufacturing time is extremely long. This is associated with the fact that the injection arm which is used to inject the material into the rotating mould is moved between different stations and that the curing time is long.

CH 684 326 describes a method where warm water is used to heat the centrifugal mould to 40° C. to 50° C. The mould is further heated as a result of the exothermal progression of the curing reaction. However, during the curing process the temperature in the outer part of the pipe remains equal to the temperature of the mould, i.e. approximately 50° C. to 60° C. but the temperature in the inner part rises to 80° C. to 120° C. As a result, the inner part of the pipe cures extremely well, but not so the part of the pipe where the heat is transmitted into the mould. Moreover, in the case of the known method the resin used for the outermost wall region of the pipe being manufactured has a gel time which amounts to 10% to 70% of the gel time of the resin used for the innermost wall region.

In practice it has proven difficult to maintain in the inner wall region the short gel time necessary for the compacting in the outermost layers not to be excessive. If excessive compacting occurs, then the glass content amounts to 70%. wt and as a consequence prevents a good curing process.

SUMMARY OF THE INVENTION

The subject of the invention is a method of manufacturing centrifuged, glass fibre-reinforced synthetic material pipes which involves introducing liquid, curable resin, which can contain a filler, together with glass fibres and additives for the curing processing, possibly also with sand, into a rotating mould. As the raw materials are introduced into the mould, the temperature of the mould amounts to between 40° C. and 75° C. and the heating capacity of the mould is so high that the raw materials do not cause the temperature of the mould to drop more than 10° C. Warm water is used to heat the mould.

The method in accordance with the invention is performed in an extremely short time and it produces pipes of improved quality.

The capacity to manufacture the pipes is increased, as described below:
 a) by using a curing temperature, a heat transmission technique and a system of curing which produces a rapid curing process without the formation of cracks;
 b) by using apparatus where the injection machine has a fixed position and the centrifugal machines, are moved with the moulds, so that one machine after the other moves into the injection position.

The quality of the pipes is improved by virtue of the fact that a mixture of polyester resin comprising a high content of filler is used but in different layers in the pipe the mixture is diluted with pure resin so that the corresponding layers contain less filler.

The heating capacity of the mould is preferably so high that the raw materials do not cause the temperature of the mould to drop more than 10° C.

By controlling the temperature of the mould, the mould heat is initially used to heat the raw materials introduced. During the curing process, heat is transmitted into the mould. As the pipe starts to contract, the majority of the reaction heat remains in the pipe.

Further, during the continuous manufacture of the pipes, the new pipe immediately after the old pipe, warm water is sprayed onto the mould, in the case of a preferred variant of the method just before the pipes are removed from the mould, so that the mould is at the same temperature which is necessary when manufacturing the new pipe.

Using these features, the curing temperature and the heat transmission technique render it possible for the pipes to cure rapidly without the formation of cracks and the finished pipes can be removed easily from the mould.

In accordance with one embodiment of the method according to the invention of manufacturing centrifuged glass fibre-reinforced synthetic material pipes liquid, curable resin, which can contain a filler, together with glass fibres and additives for the curing process, possibly also with sand, are introduced into a rotating mould which is at a temperature between 40° C. and 75° C. as the raw materials are being introduced. Once the exothermal reaction of the resin has commenced, warm water is sprayed onto the mould to maintain the temperature of the mould at least at 60° C. until the pipe is removed.

This embodiment of the method renders it possible for the curing of the manufactured pipes to proceed in a uniform manner.

When using this embodiment of the method, the warm water can be in the temperature range of 55 to 80° C.

Preferably, the temperature of the mould prior to the introduction of the raw materials is between 55° C. and 75° C.

In accordance with one advantageous embodiment of the method according to the invention, the temperature of the warm water and the period of time when it is sprayed onto the mould are selected such that the temperature of the mould remains at least at 70° C. until the pipe has been removed.

Furthermore, an embodiment of the method of manufacturing centrifuged, glass fibre-reinforced synthetic material pipes is proposed wherein liquid, curable resin, which can contain a filler, together with glass fibres and additives for the curing process, possibly also with sand, is introduced into a rotating mould and the temperature of the mould as the raw materials are introduced is between 40° C. and 75° C. The resin used for the layers in the outer region of the pipe has a gel time which is equal to or greater than the gel time of the resin used for the inner region of the pipe. Resin comprising a filler content of at least 40% and warm water at a temperature of at least 60° C. are used for the curing process.

This embodiment of the method renders it possible for the curing of the manufactured pipes to proceed in a uniform manner.

The gel time in the case of the method according to the invention is thus no shorter in the outer wall region than in the inner wall region. On the contrary, it can be expedient for it to be even longer in the outer wall region if the mould is heated to 50 to 60° C.

Preferably, the glass fibre content in the inner region of the pipe is higher than in the outer region, the filler content being correspondingly higher in the outer region. In one advantageous embodiment of the method, all the layers in the inner region with the exception of the inner cover layer contain a filler. A filler is also present in all the layers where the glass fibres are aligned in the peripheral direction. The long-term annular rigidity of the pipes manufactured according to the invention is improved.

This characteristic can be improved by using long glass fibres, i.e., glass fibres of a length more than 50 mm, preferably more than 75 mm. The length of the glass fibres used in the inner region is preferably greater than the length of the glass fibres used in the outer region of the pipe. The use of long glass fibres renders it possible to manufacture pipes which have higher bursting pressures. However, the pipes also have a lower axial strength.

In the case of small pipe diameters, approx. up to 400 mm, the axial strength can be insufficient, especially in the case of pipes with low nominal pressures. It is therefore advantageous to use longer glass fibres only on the inner side and to use short fibres of a length from 25 to 50 mm on the outer side.

Advantageously, the polyester resin can be mixed into the filler-polyester resin mixture if the core layer is manufactured with sand in the middle of the pipe. In the case of a further exemplified embodiment of the invention, the polyester resin and/or styrene are mixed into the filler-polyester resin mixture if the reinforced layers are manufactured in the inner part of the pipe.

BRIEF DESCRIPTION OF THE DRAWINGS

The invention is described hereinunder by means of examples and with reference to the drawings, this illustration serving to explain the invention but in no way limiting the invention with the explanations, and also in no way limiting the invention to the specific combination of features in the dependent claims. In the drawings:

DESCRIPTION OF THE PREFERRED EMBODIMENTS

EXAMPLE 1

Figure 1:
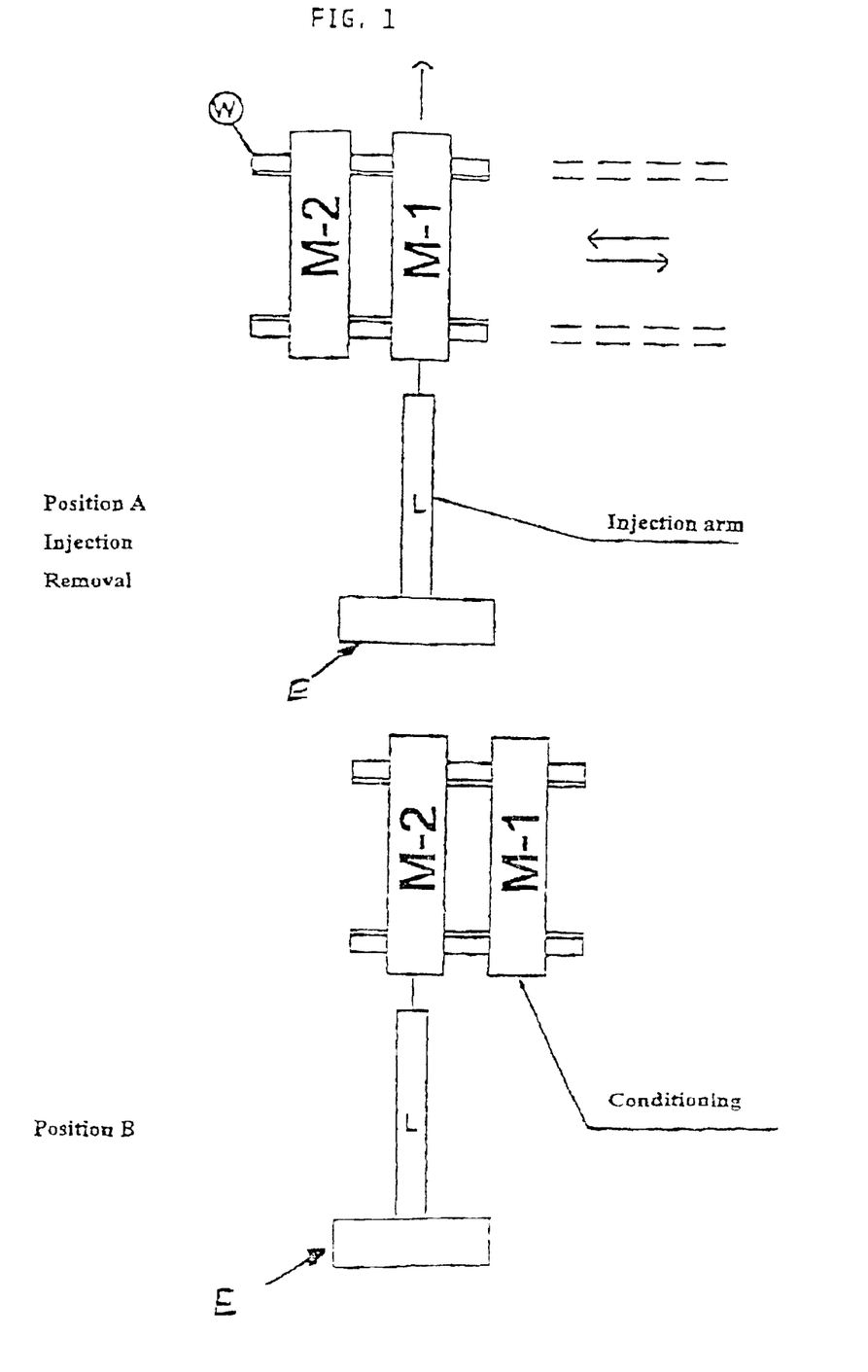
FIG. 1 shows schematically the arrangement of an injection machine and a centrifugal machine having two moulds for two method positions.

Referring to FIG. 1, the moulds (M) are mounted on a carriage (W). The carriage is moved on rails in the direction indicated by the arrows. The injection machine (E) is also mounted and moves on rails so that the lance (L) can be inserted into and removed from the mould. In this example, two moulds with a nominal diameter DN 800 are mounted on the carriage. Raw materials in accordance with Example 4 are conveyed so that eight layers of different characteristics are produced. The weight of the mould is 600 kg/m with a heating capacity of 66 kcal/m. The heating capacity of the raw materials is 26 kcal/° C.;m with an average temperature of 35° C. The mould is heated to a temperature of 65° C. with the aid of warm water being sprayed onto the outer side of the mould prior to the raw materials being introduced in layers. Owing to the high heating capacity of the mould, the raw materials and the mould are at a temperature of 56° C.

The front of the lance is provided with mixing devices which enable catalysts, accelerators, inhibitors and polyester resins, which are supplied separately, to be mixed into a mixture of polyester resin and filler and as a consequence render it possible to produce a filler mixture of different reactivity. A high reactivity is set for the outer layer of the pipes, so that this layer reacts rapidly and gelatinates under the influence of the heat from the mould. A lower reactivity is set for the next layer and the reactivity for the subsequent layers is increased step by step with the exception of the inner cover layer. The capacities to convey the raw materials are selected such that the total time required to introduce the raw materials amounts to seven minutes. The carriage is moved after eight minutes, so that the mould M2 moves into the injection position (Position B) and where it is possible to draw air at room temperature through the first pipe, so that no cracks are produced inside the tube. After the mould has been in Position B for five minutes, hot water is sprayed onto the mould from the outside, so that the mould achieves a temperature of 65° C. After a total time of 16 minutes, the carriage is moved to the starting position where the pipe is removed. Once the pipe is removed, the cycle is recommenced. Before the carriage moves into Position B, the mould M2 is heated to 65° C. using warm water. The pipe is removed from the mould M2 at Position B and a new pipe is manufactured.

The manufacturing time for one pipe amounts to 18 minutes, the production capacity is therefore 160 pipes per 24 hours.

EXAMPLE 2

Figure 2:
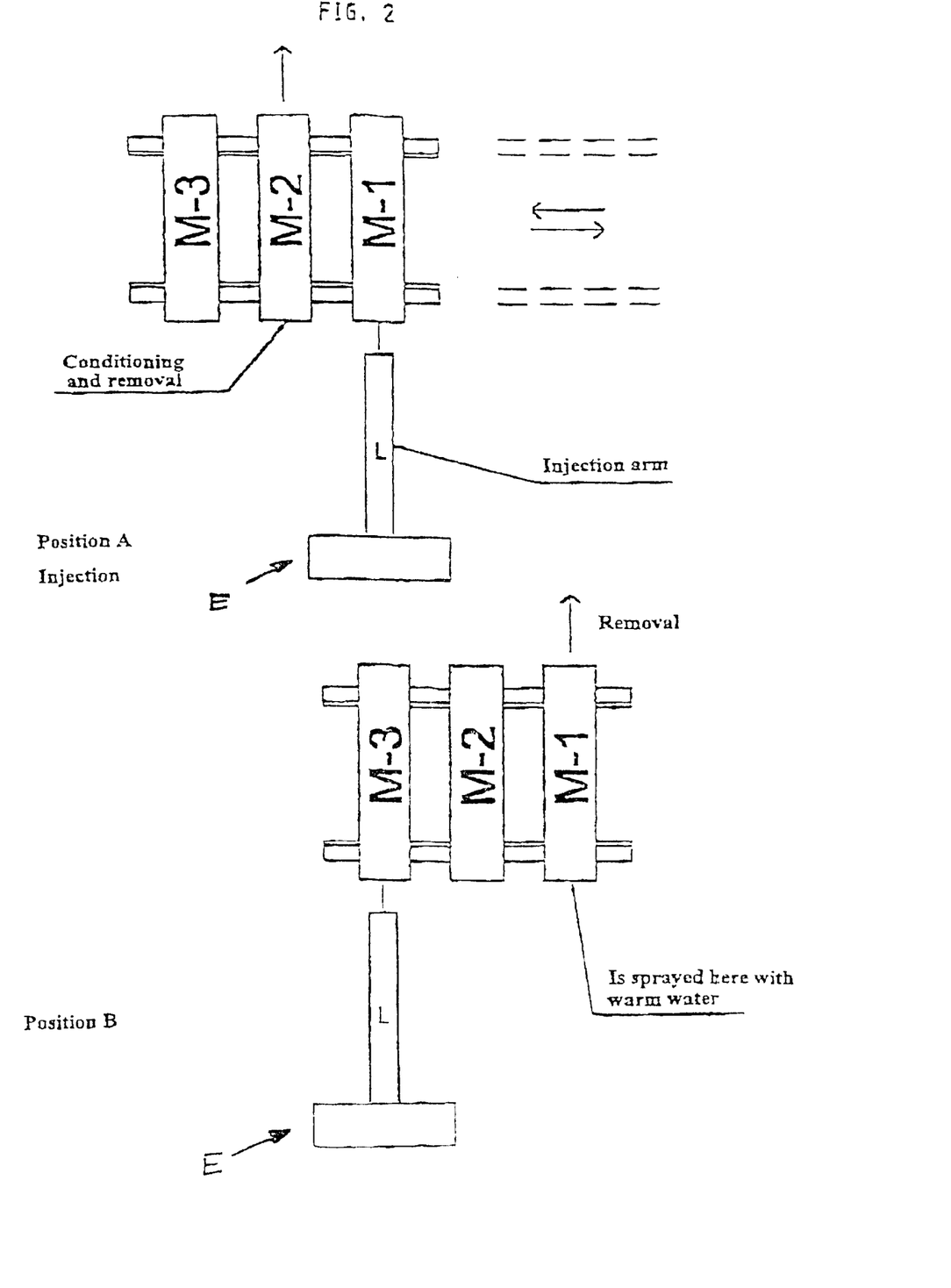
FIG. 2 shows schematically the arrangement of an injection machine and a centrifugal machine having three moulds for three method positions.

Three moulds DN 500 are mounted on the carriage in example 1, as illustrated in FIG. 2. Before the mould M-1 moves into the injection position, the mould is heated to 65° C. The injection time is four minutes. The mould M-2 is simultaneously heated to 65° C. Once the raw materials have been introduced into the mould M-2, the mould M-3 is moved into the injection position, see Position B in FIG. 2 and the mould M-1 is heated to 65° C. by spraying on warm water. The pipe is removed, prior to the mould M-1 being moved back into the injection position where the raw materials are introduced.

The cycle time amounts to 18 minutes and the production capacity amounts to 225 pipes per 24 hours. The structure of the pipe is illustrated in Example 5.

EXAMPLE 3

Four moulds DN 300 are mounted on the above described carriage. The manufacturing method is similar to that described in Examples 1 and 2 where the pipe is removed in the injection position and having two separate positions where warm water is sprayed onto the mould and the moulds being heated to 70° C. The production capacity is 300 pipes per 24 hours.

The new method is explained in further detail hereinunder. Whilst the raw materials are introduced, heat is rapidly transmitted from the mould to the material and to prevent the mould from losing too much heat, the heating capacity of the mould should be of such an extent that the temperature loss (possibly caused by the raw materials) is a maximum 10° C. The pipes start to cure as the heat is transmitted from the mould. Warm water is not used to trigger the reaction of the polyester resin, as described in the Swiss patent 684 326, but to condition the mould to the correct temperature. Other heat sources can also be used, for example, warm air.

During the first phase of the curing process, heat is rapidly transmitted into the mould. Subsequently, if the pipe starts to contract, the majority of the reaction heat remains in the pipe and as a consequence the temperature in the pipe rises. The extent of the contraction is greater, the larger the pipes and the curing system can influence the contraction especially in the case of large diameters. By increasing the reactivity in the outer layer, the contraction of the pipe away from the mould is greater than in the longitudinal direction. As a consequence, the pipe can be removed quicker and more easily.

The point in time during the curing process at which the pipe contracts has a great influence on the maximum temperature in the pipe ("peak exothermic temperature"):

In Example 1, the temperature would be approx. 96° C. if the total heat quantity were to remain in the pipe. Owing to the great amount of contraction in mm, in dependence upon the large diameter, only approx. 25% of the quantity of developed heat passes into the mould which increases in temperature from 56° C. to 60° C. The quantity of heat remaining in the pipe increases the pipe temperature to approx. 86° C.

In this case, the warm water is sprayed onto the mould prior to removing the pipe in order to increase the mould temperature.

However, in Example 3, approx. 50% of the quantity of developed heat passes into the mould, where the temperature increases to 75° C. In this case, the water sprayed on to the mould serves to direct heat from the pipe into the mould in order to prevent the temperature in the pipe from rising excessively.

It is important to select the conditions such that the pipe temperature does not exceed 100° C., so that cracks do not appear in the inner side of the pipe. This is guaranteed by selecting suitable parameters such as heat capacity of the mould, water temperature, point in time of the contraction and enthalpy of the polyester resin system, for example, quantity of filler in the resin.

Explanations

In the examples, moulds of the same nominal diameters (DN) DN 800, DN 500 and DN 300 [figures quoted in mm] are mounted on the carriage. It is also possible to mount simultaneously moulds of different diameters, for example:

DN 900, DN 800
DN 600, DN 500, DN 400
DN 350, DN 300, DN 250, DN 200

The new method using the injection machine in a fixed position offers advantages over the conventional method where the injection machine is moved to the centrifugal machines in the fixed positions. It is much easier to introduce the raw materials in the new method.

A further advantage is that the pipes are removed at a fixed position where a removal aid can be erected. In addition, the water is also sprayed on in the fixed positions and it is not necessary to construct it for each centrifugal machine.

The following examples show how the quality of the pipes is improved.

EXAMPLE 4

A pipe DN 800 in Example 1 is a multi-layer pipe PN 10 (Nominal pressure: 9.8 bar), SN 10000 (Nominal rigidity: 10,000 N/m$^2$) and it has 8 layers, as illustrated in Table 1.

Similar pipes are described in EP 0 360 758 A.

Owing to the high reactivity in the layers 6 and 7, the content of glass fibre in these layers is extremely low. In order to improve the manner in which these layers are compacted, polyester resin without a filler is mixed for this layers into the mixture of polyester resin-filler. As a consequence, the content of filler in the polyester resin is reduced from 150 parts by weight for 100 parts by weight of resin to 100 parts by weight. The glass content in layer 6 is increased from 20% to 25% and in layer 7 from 15% to 20%. Consequently, the crown pressure deformation is increased from 12% to 20%.

If still more pure resin is used, so that the filler content is reduced to 33%. wt and simultaneously the rotational rate of the mould considerably increased, then the content of glass fibre is increased to 55%. wt respectively 50%. wt. The crown pressure deformation is consequently increased to 35%. The consumption of polyester resin is greatly reduced.

EXAMPLE 5

The pipe DN 500 in Example 2, whose layer structure is illustrated in Table 2, is a waste pipe to be used where there is no internal pressure, SN 10000. The long term annular rigidity of the pipe is fairly low owing to a low content of glass fibre in the core layer of the pipe and owing to a large proportion of this layer being 40% of the total wall thickness of the pipe. For financial reasons the content of filler in the layers 2 and 5 is extremely high.

Pure resin is mixed into the mixture of filler-polyester resin when the layer 4 is manufactured. More glass fibres are used at the same time. As a consequence, the composition of the layer 4 is changed as follows:

Pure resin from 15% to 20%
Glass fibre from 4% to 8%
Filler from 30% to 25%
Sand from 51% to 47%

The long term annular rigidity is doubled as a result.

EXAMPLE 6

A pipe DN 250 is manufactured without sand but rather only with glass fibre, filler-polyester resin mixture and a flexible polyester resin as a cover layer. For 100 parts by weight of polyester resin, 250 parts filler resin were used. The pipe structure is illustrated in Table 3.

In order to achieve such a pipe structure, the viscosity of the mixture filler-polyester resin must be changed in the individual layers as must the content of filler. It is important for reasons of cost that layer 3 contains a few glass fibres and a lot of filler, owing to the lack of sand. The pipe is manufactured as described below:

The said parent mixture 250 parts by weight filler to 100 parts by weight polyester resin is conveyed continuously to the injection machine but diluted at the front in the lance with polyester resin and styrene.

The parent mixture is used for layer 1. In the case of layer 2, the parent mixture is mixed with polyester resin so that the mixture contains 33% polyester resin and the viscosity amounts to 5000 centipoise. In the case of layer 3, the parent mixture is used. In the case of layer 4, the parent mixture is mixed with styrene and polyester resin, so the viscosity amounts to 1000 centipoise.

EXAMPLE 7

When manufacturing the pipe in Example 4, a polyisocyanate on the basis of diphenylmetandiisocyante is mixed in the mixer at the front in the lance for the cover layer. The pipe manufactured in this manner has an improved resistance to water.

In order to achieve an optimum effect of isocyanate, the concentration of the isocyanate must be in the magnitude of 4 to 6%. wt. It is therefore expedient for reasons of finance to introduce the cover layer in two layers, the first layer comprising two thirds of the quantity and subsequently one third with 6% isocyanate.

It is also recommended to mix the isocyanates into the cover layer resin if the system of a GFK pipe is to be subsequently treated inside with isocyanate. Such a combination produces extraordinary results.

Further examples are now explained with reference to table 4 which illustrates an example of a multi-layer pipe in accordance with the invention. The shorter fibres in the layer 3 of this pipe contain less peripheral orientation.

EXAMPLE 8

A centrifugal mould DN 1400 is heated to 40° C. All resin-filler mixtures are set to a gel time of 15 minutes. All the layers are then introduced according to the structure illustrated in the table and the mould is then sprayed for three minutes with warm water which has a temperature of 65° C. After 30 minutes the pipe is removed.

EXAMPLE 9

A centrifugal mould DN 1400 is heated to 45° C. The number of layers in this example is 36 instead of 9. The gel time of the layers 1 to 8 amounts to 12 minutes, the gel time of layers 11 to 25 amounts to 10 minutes and the gel time of the layers 26 to 36 amounts to 7 minutes. The pipe can be removed after 10 minutes.

The filler content of the resin-filler mixture used for the pipe according to the ninth example is 40% instead of 60%. It is possible with such a pipe to accelerate the curing process.

EXAMPLE 10

A centrifugal mould DN 1800 is sprayed with warm water which has a temperature of 80° C. until the temperature of the mould is 75° C. The raw materials are then introduced in order to produce a GFK pipe with a wall thickness of 40 mm. The heating capacity of the mould is not so high, so that the temperature drop can be limited to 10° C. The temperature of the raw material mixture therefore drops to 50° C. but is sufficiently high to trigger an exothermal reaction. In order to prevent the temperature on the outer side of the pipe remaining at 50° C., the mould is sprayed five minutes after the introduction of the raw materials again with warm water which has a temperature of 80° C., so that the temperature of the mould remains at 70° C.

EXAMPLE 11

A centrifugal mould DN 200 is sprayed with warm water until the temperature of the mould amounts to 55° C. Raw materials for a pipe PN 10, SN 5000 are introduced at room temperature. The temperature of the mould drops to 45° C. The exothermal curing reaction increases the mould temperature to 50° C. In order to increase the mould temperature and to achieve a good curing process on the outer side of the pipe, the mould is sprayed, five minutes after completing the introduction of the material, for two minutes with warm water which has a temperature of 70° C., so that the mould temperature remains at least at 60° C.

In the case of conventionally centrifuged GFK pipes, the glass fibre content in the reinforced layers is lower on the inner side than on the outer side, especially where a layer of sand is found in the middle of the pipe. If with the method the content of glass fibre is increased, then these layers can be thinner and the material costs reduced. Moreover, the pipes creep less when laid in the ground. The crown pressure resistance is increased.

It is expedient to perform laboratory tests in order to set the reactivities of the different layers. Such tests were performed in moulds where the lower part comprised a thick wall and the thickness was set according to the specific moulds. The results of the tests, which were performed in a mould according to DN 300 with mould walls 12, 5 mm thick, are examined below.

A mixture of acetylacetone peroxide with t-butyl-peroxibenzoate was used as a catalyst. The quantity was normally 1.5% based on pure resin. The accelerator used was in parts a cobalt accelerator in order to trigger the reaction of the acetylacetone peroxide and N,N-diethylacetoacetamide was used to trigger the reaction of the butyl-peroxibenzoate. The cobalt accelerator contained 1% Co and was used in quantities of 1 to 3% based on pure resin. The diethylacetoacetamide (Promotor D) was used in quantities of 0.2 to 0.6%.

Figure 3:
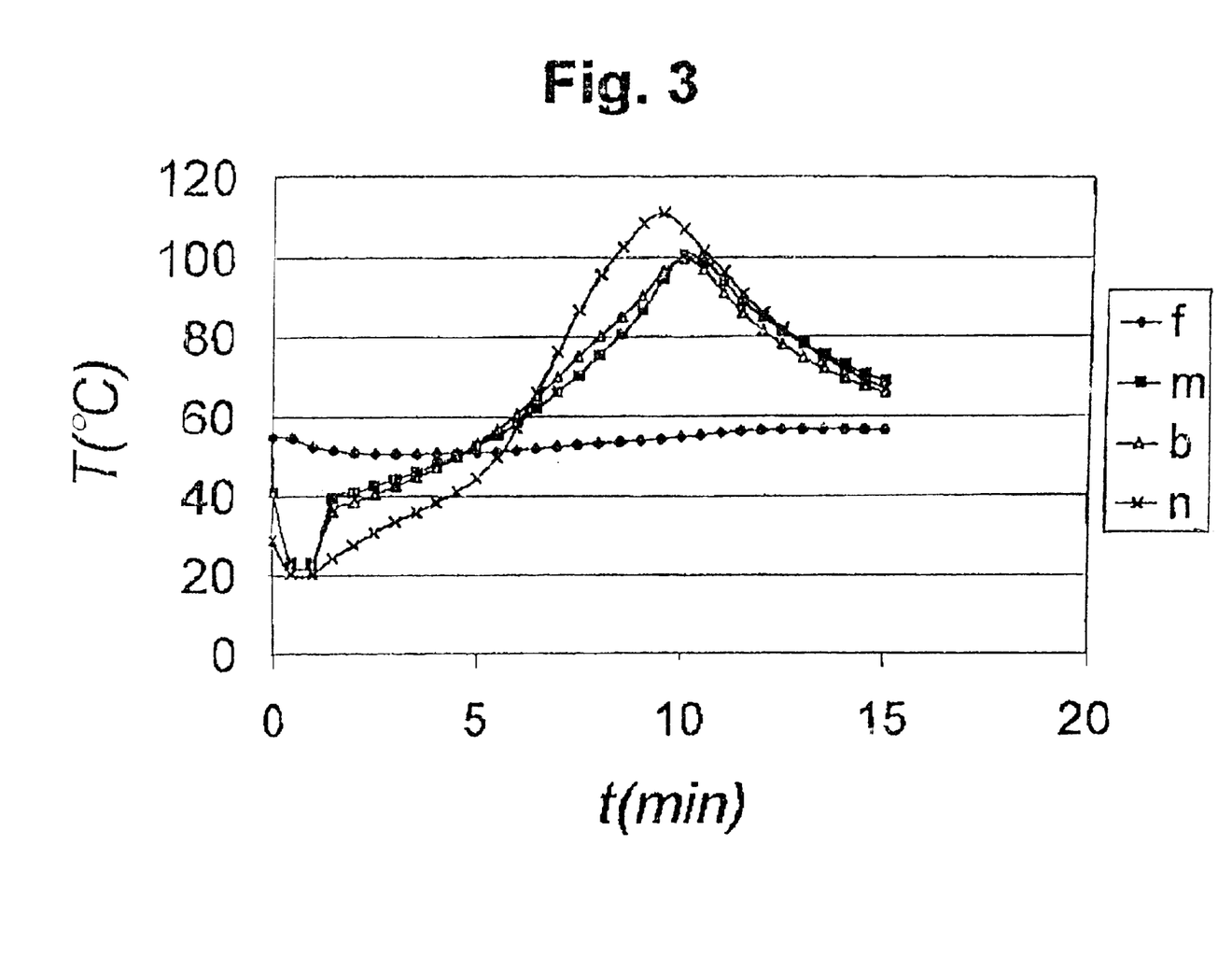
FIG. 3 shows a diagram which illustrates the temperature curve at a mould temperature of 55° C.

FIG. 3 illustrates the temperature curve at a mould temperature of 55° C. 150 parts filler to 100 parts pure resin were used: 200 g Resapol A034, 300 g filler EXP DPR, 3 ml catalyst, 0.6 Prom.D (Promotor D) and 3.2 ml Co (1%). The wall thickness of the cured mixture was 10 mm. The temperature was measured in different regions, these being represented in the legends and also in the following figures as f the mould, m the middle, b the base and ns a region in the proximity of the surface.

Figure 4:
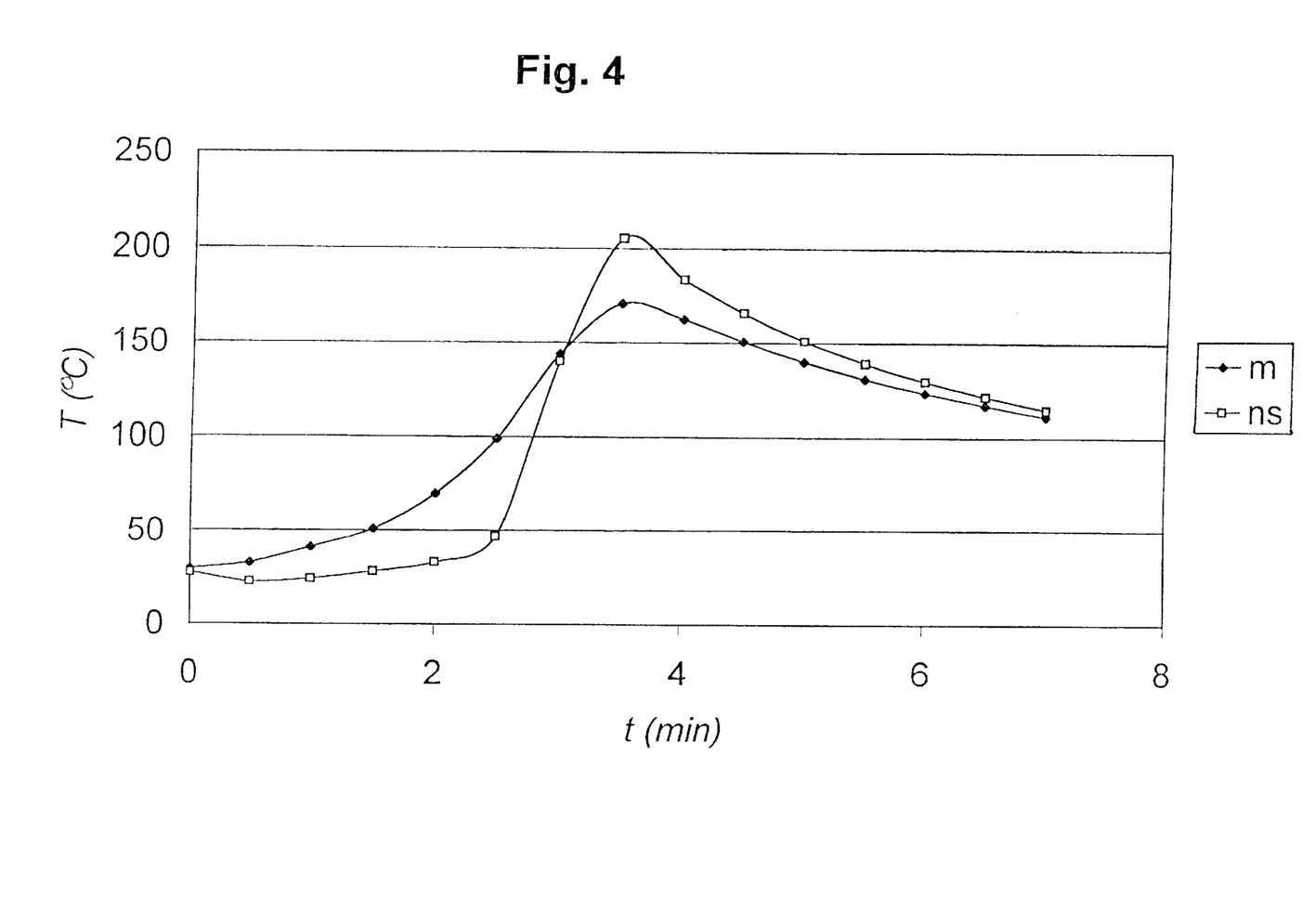
FIG. 4 shows a diagram similar to FIG. 3 and illustrating the temperature curve without the presence of a filler.

FIG. 4 illustrates a comparison to demonstrate the temperature curve in the absence of filler. 220 g Resapol A034, 2 ml catalyst, 0.6 ml Prom.D and 3.2% Co (1%) were used. The temperature rises extremely rapidly to 200° C. instead of to 110° C. in the presence of filler.

Figure 5:
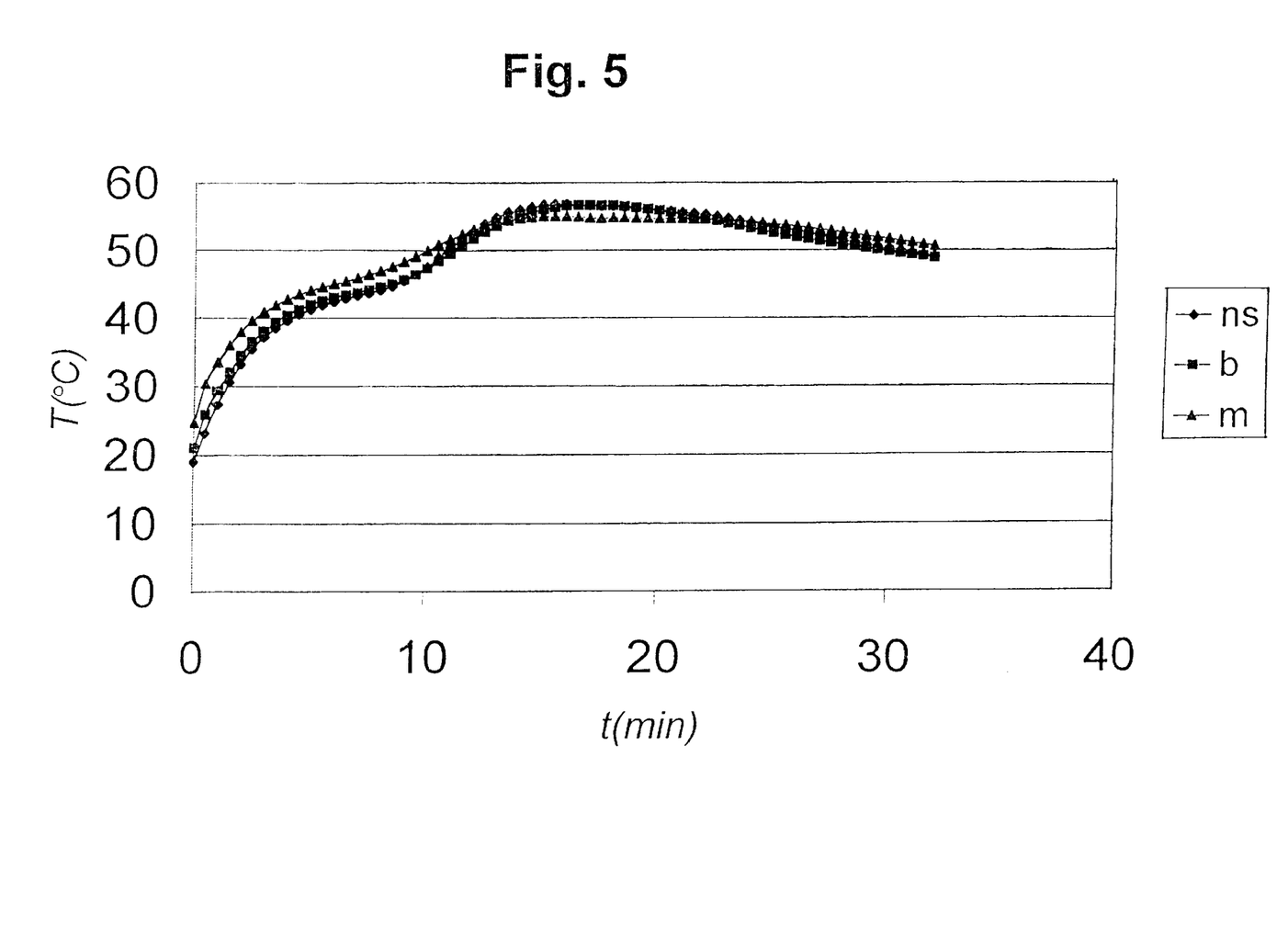
FIG. 5 shows a diagram similar to FIGS. 3 and 4 which illustrates the reduction of the reactivity by the reduction of the centrifuging rate.

FIG. 5 further illustrates the temporal behaviour of the reactivity as the acceleration rate reduces. 220 g Resapol A034, 300 g filler EXP DRP, 3 ml catalyst, 0.6 ml Prom.D and 1.6% Co (1%) were used. The reactivity of the filler mixture can be reduced by reducing the acceleration rate.

Figure 6:
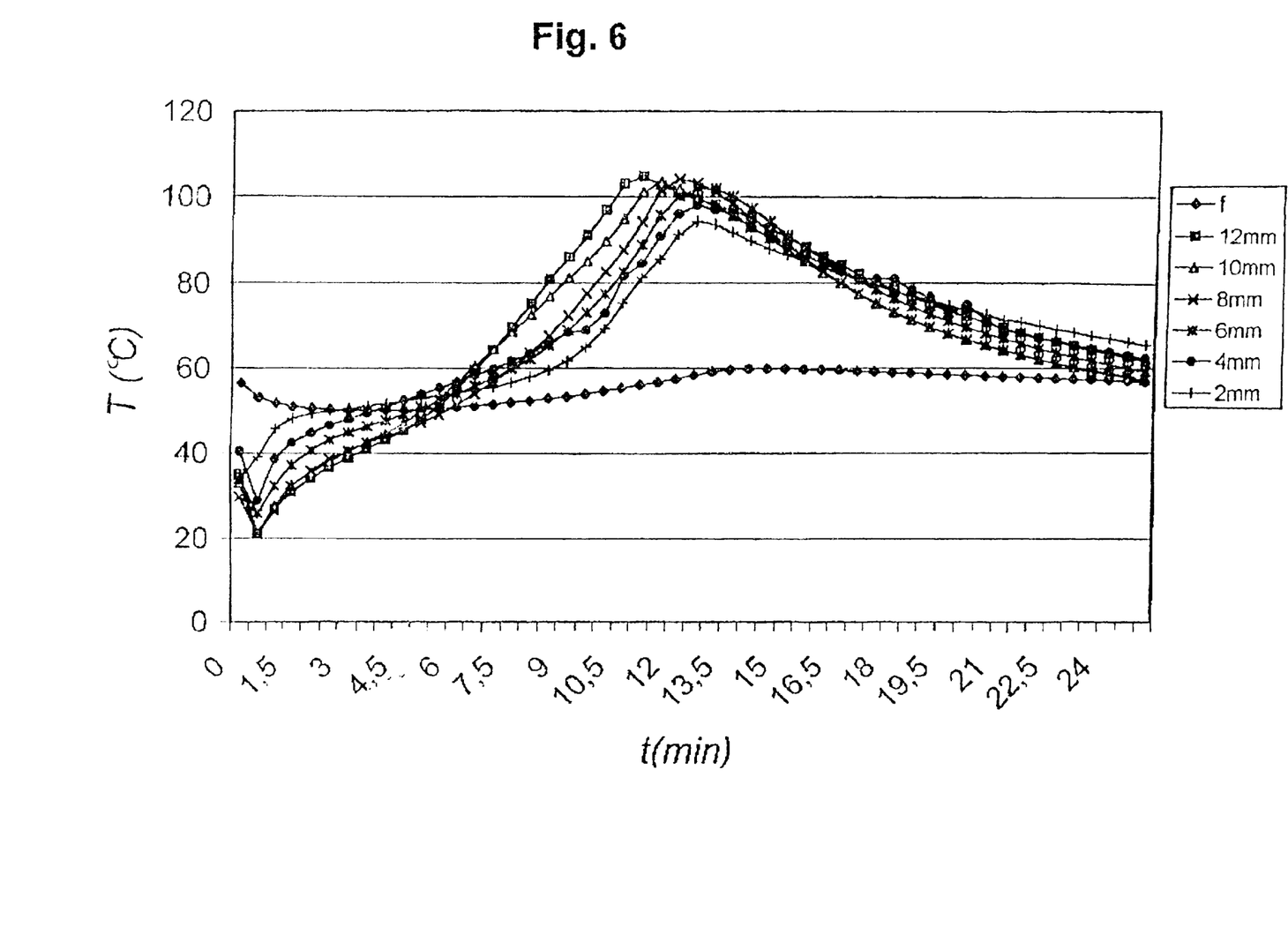
FIG. 6 shows a diagram which illustrates the temperature curve when manufacturing pipes for different measuring heights.

FIG. 6 illustrates tests which correspond to the manufacture of pipes DN 700. A mixture of resin, filler and sand was used, the glass fibres being replaced by sand in a quantity according to the heating capacity of the glass fibres: 220 g Resapol A034, 239 g filler Calcita Florada, 131 g sand, 3 ml catalyst, 0.6 ml Prom. D and 2.4% Co (1%). The temperature was measured at seven different heights, the height details referring to the ground, i.e. from where the measurements were taken.

Figure 7:
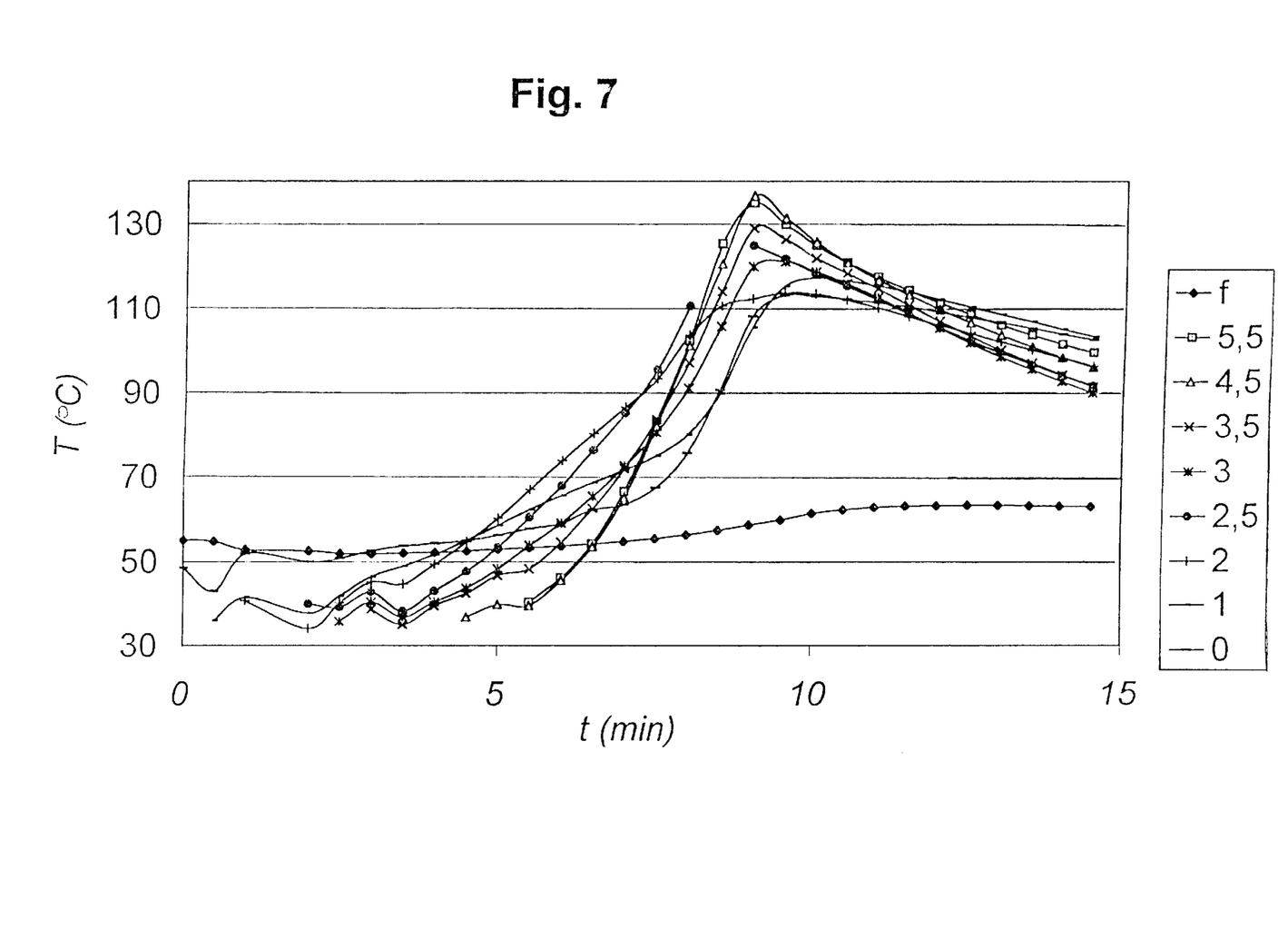
FIG. 7 shows a diagram which illustrates the temperature curve achieved at different injection times.

FIG. 7 illustrates tests undertaken with resin, filler, sand and glass fibres in a composition which corresponds to a pipe with DN 700 PN, SN 4000, including cover layer.

The following is evident from the above:

Catalysts which react at higher temperatures should be used when the temperature of the mould is in the higher range. When the temperature of the moulds is higher than 60° C., it is expedient to use only t-butyl-perbenzoate, and for temperatures below 55° C. it is expedient to use methyl-isobutyl-ketone peroxide. The use of higher temperatures improves the curing process on the outer side of the pipe. The use of a mixture of catalysts, one of which reacts at a lower temperature than the other, extends the curing time. However, the exothermic temperature is lower and as a consequence the risk of crack formation in the inner cover layer is reduced.

Recipes for the different layers in the pipes were established by means of tests of the above mentioned type, so that the layers on the inner side of pipe cure equally as quickly as the layers on the outer side, although they were introduced into the mould later. In example 9, the injection time is 12 minutes and the number of layers 36. It was necessary to set a different level of reactivity in many layers, the gel time remaining unchanged. In order to achieve a specific gel time, a layer with sand and a lot of filler must be more reactive than a layer without sand and with a little filler.

If the injection time is long, possibly because the pump capacities are low or the pipes are thick-walled, it is possible for the temperature to rise during the introduction of the raw materials. In such cases, the reactivity of the mixtures must be reduced. Owing to the higher temperatures, however, a shorter gel time and a quicker reaction are produced.

The reactivity of the mixture can be reduced by virtue of the fact that an inhibitor is added instead of an accelerator to the polyester resin at the front in the lance.

FIG. 7 illustrates tests undertaken on resin-filler mixtures for a pipe with DN 700, PN 10, SN 10000, the temperatures for the mixtures being recorded at different injection times. The gel formation occurs at a temperature of 50° C. The two first layers have a gel time of 4 to 5 minutes. This gel time extends, however, if sand and glass fibres are added simultaneously. Therefore these layers should be even more reactive. The gel time of the middle layers is somewhat too short. These layers contain high quantities of sand which extends the gel time. The last layers have excessively short gel times and the reactivity must be reduced here. The exothermic temperature is too high. However, it is substantially reduced if sand and glass fibres are added simultaneously.

The reactivities of the individual layers are partially set by virtue of the fact that different catalysts are used in different quantities. It is expedient to use a catalyst pump with two different catalysts or catalyst mixtures. One catalyst reacts at a low temperature and the other reacts at a higher temperature. The catalyst with the higher light-off temperature is then used in the end region of the injection temperature if in the case of longer injection times the temperature is so high that the resin or the resin-filler mixture were to be provided with excessively short gel times and the glass fibres could be too poorly impregnated.

Figure 8:
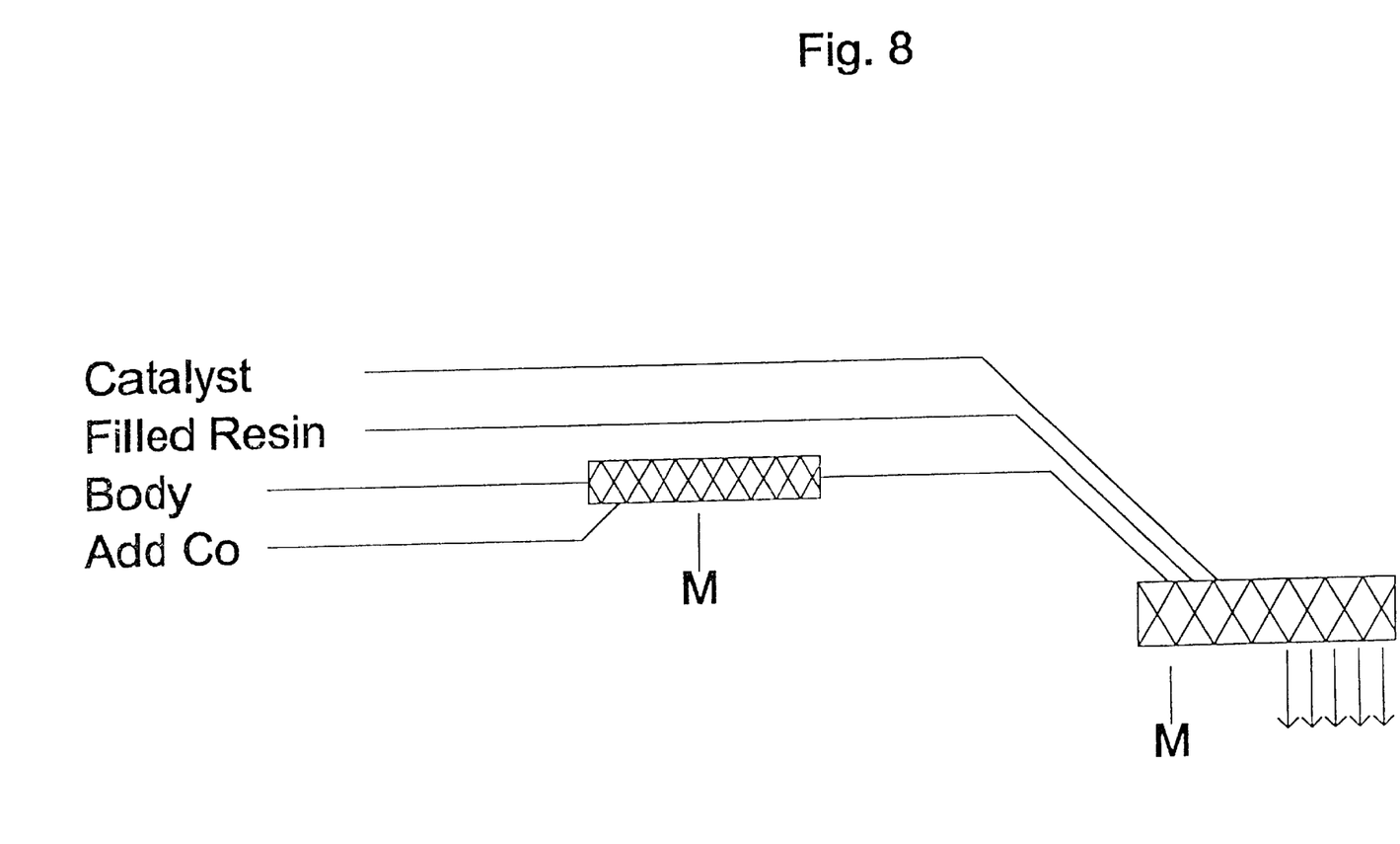
FIG. 8 shows an example for part of an installations plan of apparatus which functions in accordance with the method according to the invention for manufacturing centrifuged, glass fibre-reinforced synthetic material pipes.

The reactivity can also be set using the method as described below: A mixture of filler and resin was used with a high filler content, e.g. 200 parts filler to 100 parts resin. In the different layers pure resin is added to the mixer at the front of the injection machine. The quantity of pure resin is small in the first layers but it increases in the layers on the inner side, so that the content of glass fibres in these layers increases. Prior to the pure resin being added, the accelerator (Add Co) is added to the pure resin (Body) by using a separate mixer (M), as illustrated in FIG. 8.

What is claimed is:

1. Method of manufacturing centrifuged, glass fiber-reinforced synthetic material pipes, comprising the steps of:
   preheating a rotating mold to between 40° C. and 75° C.;
   introducing into the preheated rotating mold raw materials including
   1) a liquid, curable resin optionally containing a filler,
   2) glass fibers,
   3) additives for the curing process, and
   4) optionally sand; and
   upon commencement of exothermal curing of the resin, spraying warm water on to the mold to maintain the temperature of the mold at least at 60° C. until the pipe is removed from the mold,
   wherein the mold is selected to have a heat capacity sufficient that the raw materials do not cause the temperature of the mold to drop more than 10° C. upon introduction of the raw materials to the mold.

2. Method according to claim 1, wherein the pipe has a plurality of layers, and with the exception of cover layers outside and inside, the reactivity of the. resin in the other layers is set such that it is higher in the layers before the inner cover layer than in the layer after the outer cover layer.

3. Method according to claim 1, wherein the pipes are manufactured in a continuous manner, a new pipe immediately after an old pipe, and shortly prior to removing the pipes, warm water is sprayed onto the mold so that the mold maintains the same temperature which is necessary when manufacturing the new pipe.

4. Method according to claim 1, wherein the warm water temperature and spraying duration is sufficient that the mold remains at a temperature of least at 70° C. until the pipe is removed.

5. Method according to claim 1, wherein a polyester resin, styrene or a mixture thereof is added to the raw materials in a mixer at a front portion in a lance of an injection machine.

6. Method according to claim 5, wherein more polyester resin is added to layers on an inner side of the pipe than on an outer side.

7. Method according to claim 5, wherein an either an accelerator or an inhibitor for the polyester resin is added at the front in the lance of the injection machine to different, layers, in order, respectively, to increase the reactivity in the layers or to reduce the reactivity in the layers.

8. Method according to claim 7, wherein a mixture of accelerator and polyester resin is added to sand layers in a middle portion of the pipe in order to increase the reactivity of the raw materials there.

9. Method according to claim 1, wherein at least two catalyst pumps are used with different catalysts, a catalyst or a catalyst mixture being used which has a lower light-off temperature in one pump and a catalyst or a catalyst mixture being used which has a higher light-off temperature in the other pump, the catalyst or the catalyst mixture which has the higher light-off temperature being used to extend the gel time.

10. Method according to claim 1, wherein an inner portion of the pipe has a higher glass fiber content than an outer portion, and with the exception of the inner cover layer, all the layers in the inner portion of the pipe contain filler.

11. Method according to claim 1, wherein the glass fibers in an inner portion of the pipe are of a greater length than the glass fibers in an outer portion of the pipe.

12. Method according to claim 1, wherein in an outer portion of the pipe in layers in which there is no sand, in part short glass fibers are used and in part long glass fibers are used.

13. Method according to claim 1, wherein isocyanate is mixed into the resin for an inner cover layer, and first, a greater part of the cover layer without isocyanate is introduced and then the remainder of the cover layer with isocyanate in a quantity of 4 to 6% by weight is added and subsequently the finished pipe is treated on the inner side with isocyanate.

14. Method according to claim 1, wherein the raw materials are introduced from an injection machine into a rotating mold, the mold and the injection machine being movable in a common plane, the injection machine operates from a fixed position and the injection machine is mounted on a carriage which is displaced horizontally with respect to the movement of the centrifugal machine.

15. Method of manufacturing centrifuged, glass fiber-reinforced synthetic material pipes, comprising the steps of:

preheating a rotating mold to between 40° C. and 75° C.;

introducing into the preheated rotating mold raw materials including
1) a liquid, curable resin containing a filler in an amount of at least 40% by weight,
2) glass fibers,
3) additives for the curing process, and
4) optionally sand; and upon commencement of exothermal curing of the resin, spraying warm water having a temperature of at least at 60° C. on to the mold until the pipe is removed from the mold, wherein the resin is introduced in layers into the mold, with resin used for layers in an outer region of the pipe having a gel time which is equal to or greater than the gel time of resin used for inner regions of the pipe.

16. Method according to claim 15, wherein the pipes are manufactured in a continuous manner, a new pipe immediately after an old pipe, and shortly prior to removing the pipes, warm water is sprayed onto the mold so that the mold maintains the same temperature which is necessary when manufacturing the new pipe.

17. Method according to claim 15, wherein the warm water temperature and spraying duration is sufficient that the mold remains at a temperature of least at 70° C. until the pipe is removed.

18. Method according to claim 15, wherein polyester resin, styrene or a mixture thereof is added to the raw materials in a mixer at a front portion in a lance of an injection machine.

19. Method according to claim 18, wherein more polyester resin is added to layers on an inner side of the pipe than on an outer side.

20. Method according to claim 18, wherein an either an accelerator or an inhibitor for the polyester resin is added at the front in the lance of the injection machine to different layers, in order, respectively, to increase the reactivity in the layers or to reduce the reactivity in the layers.

21. Method according to claim 20, wherein a mixture, accelerator and polyester resin is added to sand layers in a middle portion of the pipe in order to increase the reactivity of the raw materials there.

22. Method according to claim 15, wherein at least two catalyst pumps are used with different catalysts, a catalyst or a catalyst mixture being used which has a lower light-off temperature in one pump and a catalyst or a catalyst mixture being used which has a higher light-off-temperature in the other pump, the catalyst or the catalyst mixture which has the higher light-off temperature being used to extend the gel time.

23. Method according to claim 15, wherein an inner portion of the pipe has a higher glass fiber content than an outer portion.

24. Method according to claim 15, wherein the grass fibers in an inner portion of the pipe are of a greater length than the glass fibers in an outer portion of the pipe.

25. Method according to claim 15, wherein in an outer portion of the pipe in layers in which there is no sand, in part short glass fibers are used and in part long glass fibers are used.

26. Method according to claim 15, wherein isocyanate is mixed into the resin for an inner cover layer, and first, a greater part of the cover layer without isocyanate is introduced and then the remainder of the cover layer with isocyanate in a quantity of 4 to 6% by weight is added and subsequently the finished pipe is treated on the inner side with isocyanate.

27. Method according to claim 15, wherein the raw materials are introduced from an injection machine into a rotating mold, the mold and the injection machine being movable in a common plane, the injection machine operates from a fixed position and the injection machine is mounted oh a carriage which is displaced horizontally with respect to the. movement of the centrifugal machine.

28. Method according to claim 15, wherein with the exception of cover layers outside and inside, the reactivity of the resin in the other layers is set such that flit is higher in the layers before the inner cover layer than in the layer after the outer cover layer.

* * * * *